United States Patent [19]
Lo et al.

[11] Patent Number: 5,592,486
[45] Date of Patent: Jan. 7, 1997

[54] SYSTEM AND METHOD FOR EFFICIENTLY MONITORING INFORMATION IN A NETWORK HAVING A PLURALITY OF REPEATERS

[75] Inventors: William Lo, Santa Clara; Ian S. Crayford, San Jose, both of Calif.

[73] Assignee: Advanced Micro Devices, Inc., Sunnyvale, Calif.

[21] Appl. No.: 406,081

[22] Filed: Mar. 17, 1995

[51] Int. Cl.[6] .................................................. H04J 3/24
[52] U.S. Cl. ........................ 370/389; 370/471; 370/501
[58] Field of Search .............................. 370/13, 13.1, 17, 370/56, 60, 85.13, 94.1, 94.3, 82, 83, 97, 109, 118

[56] References Cited

U.S. PATENT DOCUMENTS 5,293,379  3/1994  Carr ....................................... 370/118 X
5,396,495  3/1995  Moorwood et al. ..................... 370/94.1

FOREIGN PATENT DOCUMENTS

495575A1  7/1992  European Pat. Off. .
589738A1  8/1993  European Pat. Off. .

Primary Examiner—Benedict V. Safourek
Attorney, Agent, or Firm—Berman Collins & Sawyer

[57] ABSTRACT

A method and apparatus for efficiently transferring a data packet on a network. The efficient transfer of data includes compressing the data as the data packet is transmitted from a repeater to a management unit by determining if a destination address of a received packet matches a stored management unit address. When the stored address does not match the destination address, the data packet is compressed. The apparatus includes a repeater, a management unit, and a packet compression mechanism. The apparatus further includes comparator circuit means for determining address comparisons and count comparisons to control data compression.

35 Claims, 6 Drawing Sheets

FIGURE 1

802.3 PACKET

| PREAMBLE 1010...1010 | SFD 10101011 | DA | SA | LENGTH | LLC DATA | LLC PAD | FCS |
|---|---|---|---|---|---|---|---|
| 56 BITS | 8 BITS | 6 BYTES | 6 BYTES | 2 BYTES | 46-1500 BYTES | | 4 BYTES |

FIGURE 2

ETHERNET PACKET

| PREAMBLE 1010...1010 | SYNCH 11 | DA | SA | TYPE | DATA | FCS |
|---|---|---|---|---|---|---|
| 62 BITS | 2 BITS | 6 BYTES | 6 BYTES | 2 BYTES | 46-1500 BYTES | 4 BYTES |

5,592,486

1

SYSTEM AND METHOD FOR EFFICIENTLY MONITORING INFORMATION IN A NETWORK HAVING A PLURALITY OF REPEATERS

CROSS REFERENCE TO RELATED APPLICATIONS

"Expandable Repeater" (Vijeh, Staab), U.S. Pat. No 5,265,123.

"Programmable Address Mapping Matrix for Secure Networks" (Lo, Crayford), U.S. patent application (Ser. No. 08/366,809) filed Dec. 30, 1994.

"A Method and System for Increasing Network Information Carried in a Data Packet Via Packet Tagging" (Crayford, Lo), Ser. No. 08/406,085, filed on even date herewith.

FIELD OF THE INVENTION

The present invention relates generally to monitoring information of a data packet on a local area network and more particularly to monitoring information while reducing memory storage requirements on the network.

BACKGROUND OF THE INVENTION

In traditional Ethernet (802.3 10BASE5) and Cheapernet (802.3 10BASE2) a coaxial cable provides the linear bus to which all nodes are connected. Signalling is achieved using a current sink technique with a center conductor used for the signal and a shield used as a ground reference. All devices are connected to the coaxial bus, and therefore all devices will receive the transmission of a single device. Twisted pair Ethernet (802.3 10BASE-T) utilizes standard voice grade telephone cable, employing differential signalling on separate transmit and receive pairs of the cables. 10BASE-T provides only a point-to-point communication capability and requires additional active elements, e.g., a repeater, to provide a point-to-multipoint local area network (LAN) capability. An Ethernet network system typically includes a number of interconnected cable segments. A repeater is used to interconnect two or more cable segments. Each cable segment may be one of a variety of cable types, for example, coaxial or twisted pair. The repeater performs signal amplitude and timing restoration on an incoming bitstream and repeats the bitstream to all of the ports connected to the repeater. By repeating data to all ports, the repeater acts as a logical coaxial cable so that any node connected to the network will see another node's transmission.

Traditionally, repeaters allow wired coaxial Ethernet to extend a network's physical distance limit. For twisted pair Ethernet, if more than two nodes are required to provide connectivity, the IEEE 802.3 10BASE-T Standard mandates the use of a repeater. Although the physical signalling on the coaxial and twisted pair cabling differs, the functionality of the repeater for either is identical as is the frame or packet format used to pass messages through the repeater between the participating nodes on the network.

FIGS. 1 and 2 show the format for an IEEE 802.3 Standard compliant packet and an Ethernet packet, respectively. The packet commences with a preamble sequence which is an alternating (1,0) pattern. The preamble provides a single frequency on the network, in this case 5 Mega Hertz (MHz) at the start of each frame, which allows a receiver to lock to the incoming bitstream. The preamble sequence is then followed by a start of frame indicating that the data portion of the message will follow. Either a start of frame

2 delimiter (802.3) or synch sequence (Ethernet) is used to delineate the start of the data portion of the message. A primary difference as shown is the start of frame delimiter (SFD). For 802.3, the SFD is defined as a byte that has a "1,0, 1,0, 1,0, 1,1" pattern whereas the start frame (synch) of Ethernet is a "1,1" sequence. However, in both cases the preamble plus the start of frame indication is a total of 64 bits long.

Regarding packet size, both 802.3 and Ethernet standards specify that a packet must be in the range of 64–1518 bytes. However, the actual data field in the 802.3 system is permitted to be smaller than the 46 byte value that ensures a minimum packet size. The Media Access Control sub-layer appends pad characters to a Logical Link Control (LLC) data field before sending data over the network to compensate for a smaller data field. The Ethernet standard assumes that the upper layer ensures that the minimum data field is 46 bytes before passing data to a Media Access Control (MAC) sublayer and the existence of these appended characters is unknown to the MAC device.

The 802.3 standard also uses a length field which indicates the number of data bytes that are in the LLC data and pad fields only. The high order byte of the length field is transmitted first with the least significant bit (LSB) of each byte transmitted first. Ethernet, on the other hand, uses a type field in the same two bytes of the frame to identify the message protocol type.

The data field contains the actual packet data that is being transferred and is between 46 to 1500 bytes in length. Since valid Ethernet type fields are always assigned outside of the valid maximum 802.3 packet length size, both 802.3 and Ethernet packets can coexist on the same network.

The LLC function fragments data into block sizes suitable for transmission over the network. Data bytes are transmitted sequentially with the LSB of each byte transmitted first. Following the LLC data/pad fields, the frame check sequence (FCS) is a four-byte field that contains the cyclic redundancy check (CRC) for the entire frame. The CRC is computed by the transmitting station on the destination address, source address, length/type, and data field and is appended as the last four bytes of the frame. The same CRC algorithm is used by the receiving station to compute the CRC value for the frame as it is received. The value computed at the receiver is compared with the value appended by the transmit station to provide an error detection mechanism for corrupted data. The CRC bits within the FCS are transmitted in the order most significant bit to least significant bit.

Two other fields of the frame are the destination address (DA) and the source address (SA) for the frame. Both addresses are 48 bit values transmitted LSB first. A receiving MAC determines if a match exists between the receiver's node address and the address within the DA field. Only a node indicated as matching should attempt to receive the remainder of the packet.

Three types of destination addressing are supported by the 802.3 and Ethernet standards.

1. Individual. The DA field contains an individual and unique address assigned to one node on the network.

2. Multicast. If the first bit of the DA field is set this indicates that the group address is being used. The group of nodes that will be addressed is determined by a higher layer function but in general the intent is to transmit a message between a logically similar subset of nodes on the network.

3. Broadcast. The broadcast is a special form of multicast address where the DA field is set to all 1s. The address is reserved, and all nodes on the network must be capable of receiving a broadcast message.

The source address field is supplied by the transmitting MAC. The transmitting MAC inserts a sender's node address into the SA field as the frame is transmitted to indicate the node as the originating station of the packet. The receiving MAC is not required to take action based on the SA field.

Network management, analysis and/or diagnostic equipment is typically concerned with the information in a packet that determines statistical information for the network. Statistical information includes what type of packets are on the network, e.g., what type of protocols are being used on the network, the packet sender, the packet receiver, and distribution of the lengths of the packets being transferred on the network to identify how well a network is being utilized. The statistical information typically comprises approximately the first forty bytes of the data packets being sent on the network.

Usually, the MAC used in such network equipment operates in promiscuous mode in order to see every packet and collect the data necessary to compile the statistics for the network. Unfortunately, while in promiscuous mode, the MAC receives all packets on the network, and an intelligent system must sift through the data in each packet in order to extract the statistical information from the packet. The data extraction process requires significant processing time and ability by the intelligent system, especially for large data packets. Large data packets further require greater memory storage space in the intelligent system.

A need exists to determine statistical information on a network using a MAC that reduces processing time and complexity as well as memory storage requirements without compromising the integrity of the data gathered from the network and the data packets transferred on the network. The present invention addresses these needs.

SUMMARY OF THE INVENTION

The present invention provides a method and apparatus for efficiently transferring information of a data packet on a network. The efficient transfer includes controlling compression of the data packet for transmission from a repeater to a management unit in the network.

In a first aspect of the present invention, a data packet having a destination address is received on a repeater. It is then determined if the destination address matches an associated stored management unit address. The data packet is compressed if the stored address does not match the destination address. In a further aspect, the data packet is compressed by identifying a SFD sequence in the data packet and counting the number of data bytes in the packet after the SFD sequence is identified. Transmission of the data packet to the management unit is halted once the counted number of bytes matches a stored number of bytes. Finally, a valid FCS sequence is provided when enabled at the end of the compressed data packet.

In another aspect of the present invention an apparatus includes a repeater, a management unit, and a packet compression mechanism. The repeater receives a data packet having a destination address. The management unit includes a stored address and determines network statistics based on the data packet. The packet compression mechanism compresses the data packet based on a comparison of the destination address to the stored address. The apparatus further includes comparator circuits for determining address comparisons and count comparisons to control data compression.

In yet another aspect of the present invention, a repeater mechanism includes a repeater front end mechanism coupled to a packet compression mechanism. The packet compression mechanism performs a comparison between a destination address received in a data packet from the receiver front end mechanism and a stored address. The packet compression means compresses the data packet when the stored address and the destination address do not match.

With the present invention, statistical information is provided to a MAC unit in a more economical manner. Data packets are truncated following transmission of a chosen number of bytes to the MAC when the data packet is not addressed to the MAC. The reduced size of the data packet to the MAC reduces the memory storage requirements in the MAC. The reduced size also reduces the complexity and length of data transfers to the MAC.

These and other advantage of the present invention will be readily apparent from the following discussion of the present invention.

BRIEF DESCRIPTION OF THE DRAWINGS

FIG. 1 shows the format for an 802.3 packet.

FIG. 2 shows a format for an Ethernet packet.

DETAILED DESCRIPTION OF THE INVENTION

The present invention is directed toward a system for performing compression of a data packet for transfer to a management unit of a repeater in a local area network. The following description is presented to enable one of ordinary skill in the art to make and use the invention and is provided in the context of a patent application and its requirements. Various modifications to the preferred embodiment and the generic principles and features described herein will be readily apparent to those skilled in the art.

The system as described allows the management unit of a repeater or group of repeaters in a network to properly monitor the network and gather statistical information on the data packets being transferred on the network with a reduction in memory storage requirements and processing time. Typically, in the 802.3 Ethernet standard, the statistical information carried in the data packet and used by the management unit is contained in about the first forty bytes of the data packet. Management units therefore normally are not concerned with the remaining bytes in the data packet and waste memory space and processing time having to receive and subsequently store these remaining bytes.

The present invention provides for a packet compression circuit that allows the management unit to properly determine statistical information while reducing the memory storage requirements and processing time of a managed repeater system by truncating the data packet. Truncation of the data packet occurs following completion of the transfer of approximately the first forty bytes of data during most data transfers.

Figure 3:
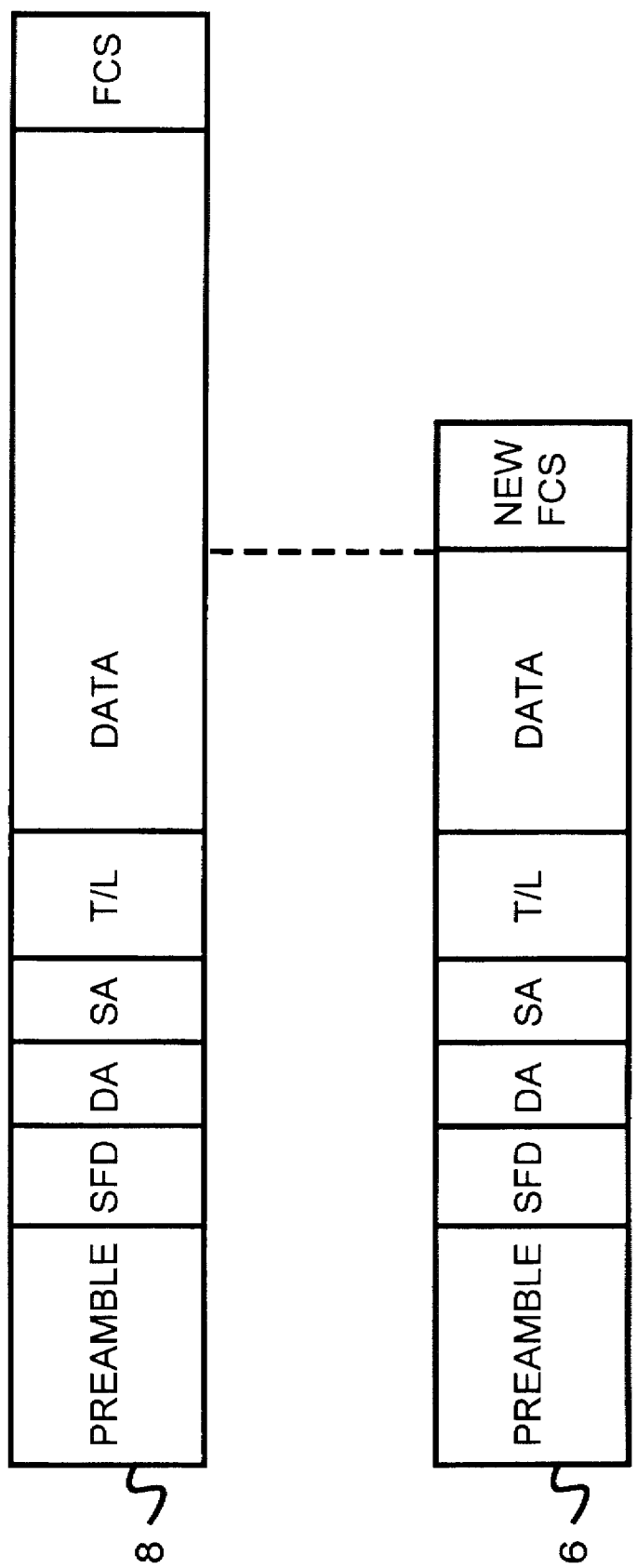
FIG. 3 illustrates a data packet and a compressed data packet in accordance with the present invention.

FIG. 3 illustrates a compressed data packet 6 in accordance with the present invention compared with an original data packet 8. As shown, the preamble, SFD, destination address (DA), source address (SA), and type or length (T/F) field for the two packets 6 and 8 are the same. The compressed packet 6 further contains a portion, i.e., a chosen number of bytes of the data field of the original data packet 8. Compressed packet 6 also contains a new FCS sequence when appropriate, as described in more detail with reference to the FIGS. 4–7. Thus, as shown in FIG. 3, the compressed data packet 6 formed in accordance with the present invention is significantly smaller than the original data packet 8, but still contains the statistical data used by the MAC unit.

Figure 4:
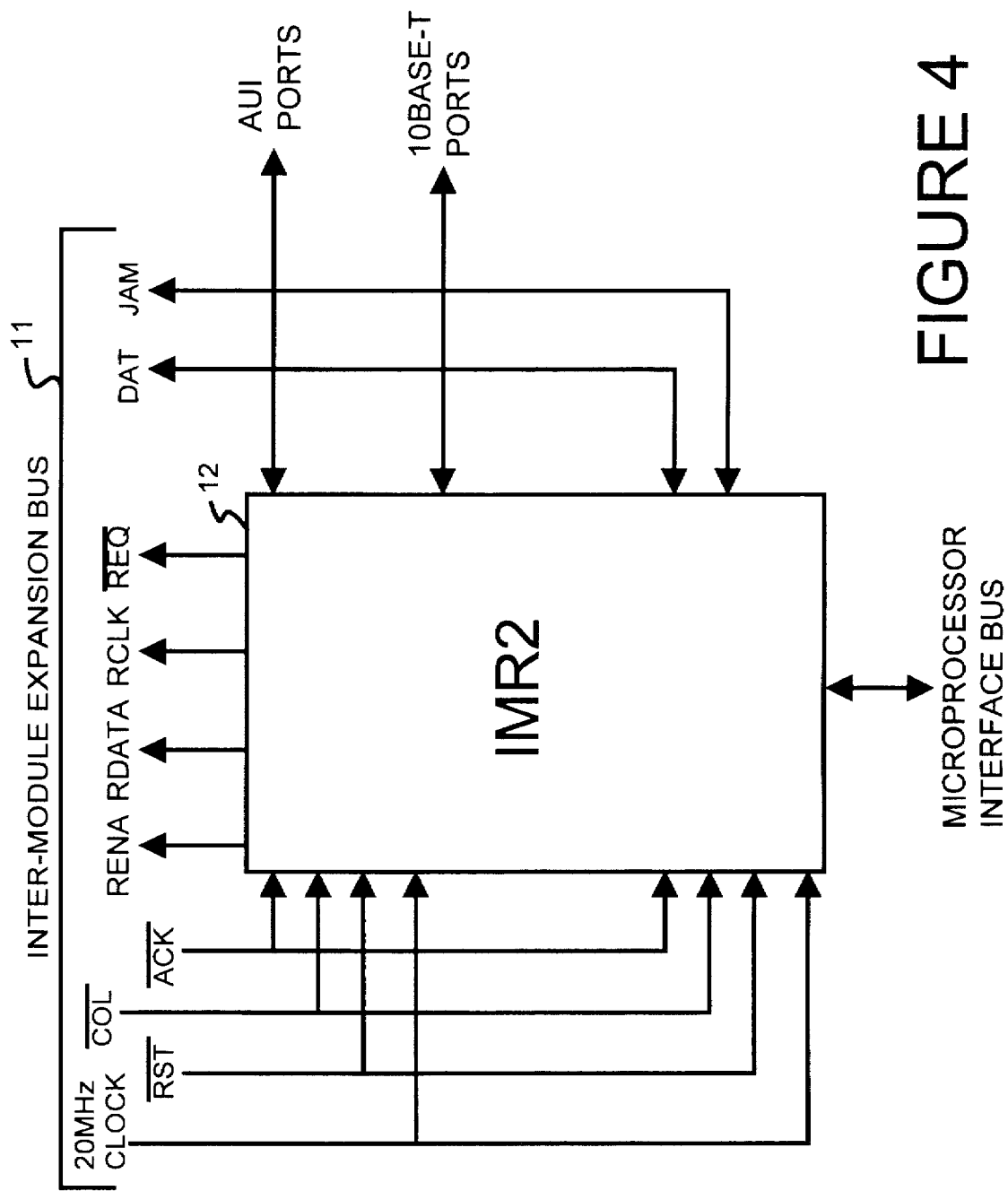
FIG. 4 is a simplified block diagram of an Integrated Multiport Repeater (IMR2) in accordance with the present invention.

Referring now to FIG. 4, the present invention comprises an Integrated Multiport Repeater (IMR2) device 12 in a preferred embodiment. The IMR2 device provides the basic repeater function, performing signal amplitude and timing restoration, incorporating individual 10BASE-T ports, and Attachment Unit Interface (AUI) ports. The AUI ports allow connection of the 10BASE-T ports to an existing coaxial wired Ethernet/Cheapernet network. The IMR2 device also provides an inter-module expansion bus 11, which allows multiple IMR2 devices to be cascaded together, and still be treated as a single repeater.

The inter-module expansion bus 11 comprises the signals RST (Reset), 20 MHz clk (20 MHz clock), REQ (Request), ACK (Acknowledge), COL (Collision), DAT (Data) and JAM (Jam). The operation of this type of expansion scheme is described in U.S. Ser. No. 07/556,046, entitled Expandable Repeater and assigned to the assignee of the present application.

Note that the data passed across this expansion bus on the DAT line is a restored version of the incoming packet data received when a single port of the IMR2 device (or group of devices) is active. This means that the preamble field of the packet which is passed across the DAT pin is restored, substantially reducing or eliminating preamble shrinkage effects due to the start up delays of the receive circuits.

In addition, the IMR2 device 12 also has a management port (not shown), to allow configuration and monitoring of the operational state of the repeater.

The IMR2 12 device further provides monitoring for all network activity detected by the IMR2 device. The IMR2 12 collects statistics based on the type of network activity, and stores this information internally as registers which can be accessed by an external host device, such as a microprocessor using the management port. The host typically uses the data collected and stored by the IMR2 12 device to provide network management information, in order to more easily administer the operation and/or fault diagnosis of the network.

The IMR2 12 provides the advantages above described. The following discussion more fully presents the operation of the device. The sizes of the various devices and signals in the following are arbitrary and one of ordinary skill in the art will recognize that many other combinations could be used and still be within the spirit and scope of the present invention.

Figure 5:
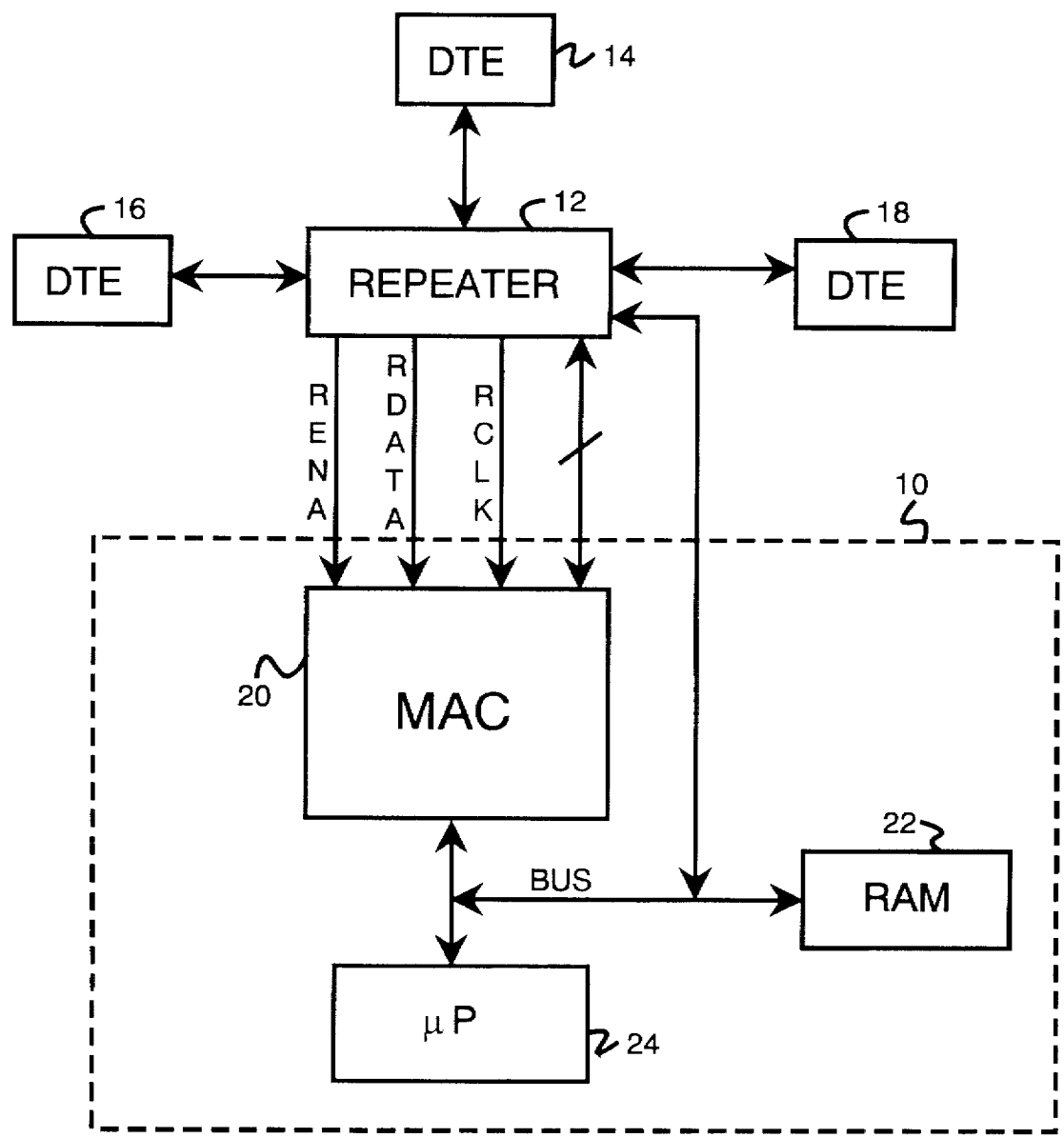
FIG. 5 is a block diagram illustrating a repeater and management unit arrangement in accordance with the present invention.

FIG. 5 presents an overall system configuration in accordance with one aspect of the present invention. The repeater, IMR2 12, is connected with, for illustration purposes, three data terminal equipment, DTE, units 14, 16, and 18. Data is transmitted from the DTE units 14, 16, or 18 through repeater 12 and management unit 10 with the management unit 10 typically recording network management information from the data.

The management unit 10 interfaces with the repeater 12 through an expansion bus 11 comprising multiple communication signals, including RENA (receive enable), RDATA (receive data), and RCLK (receive clock) signals. Information received from the repeater, i.e. data in a data packet, is transmitted to the MAC unit 20 of the management unit 10.

Typically, a MAC unit 20 removes the preamble and SFD portions of a packet and performs error checking routines on the packet. The contents of the frame are usually then transferred to a random access memory (RAM) unit 22 with the MAC 20 writing either the entire frame into the RAM 22 or none of the frame, unless a collision occurs. When a collision occurs, only a portion of the frame may be written and the MAC 20 may operate to correct any discrepancies resulting from the collision. A microprocessor 24 reads the data stored in the RAM 22 and processes the data to extract statistics concerning the data packet.

As described, in a typical situation, the management unit 10 has to transfer and store entire packets of information, while the statistical information it is concerned with is usually in the header of the packets. As mentioned previously, the header typically comprises approximately the first forty bytes of a packet. Thus, for a packet having up to 1518 bytes in a frame, the MAC 20 requires a larger RAM 22 to store the entire frame, wastes processing time of the microprocessor 24 to transfer the entire frame, and uses a larger bandwidth bus to complete the data transfer of the entire frame than is actually needed.

Figure 6:
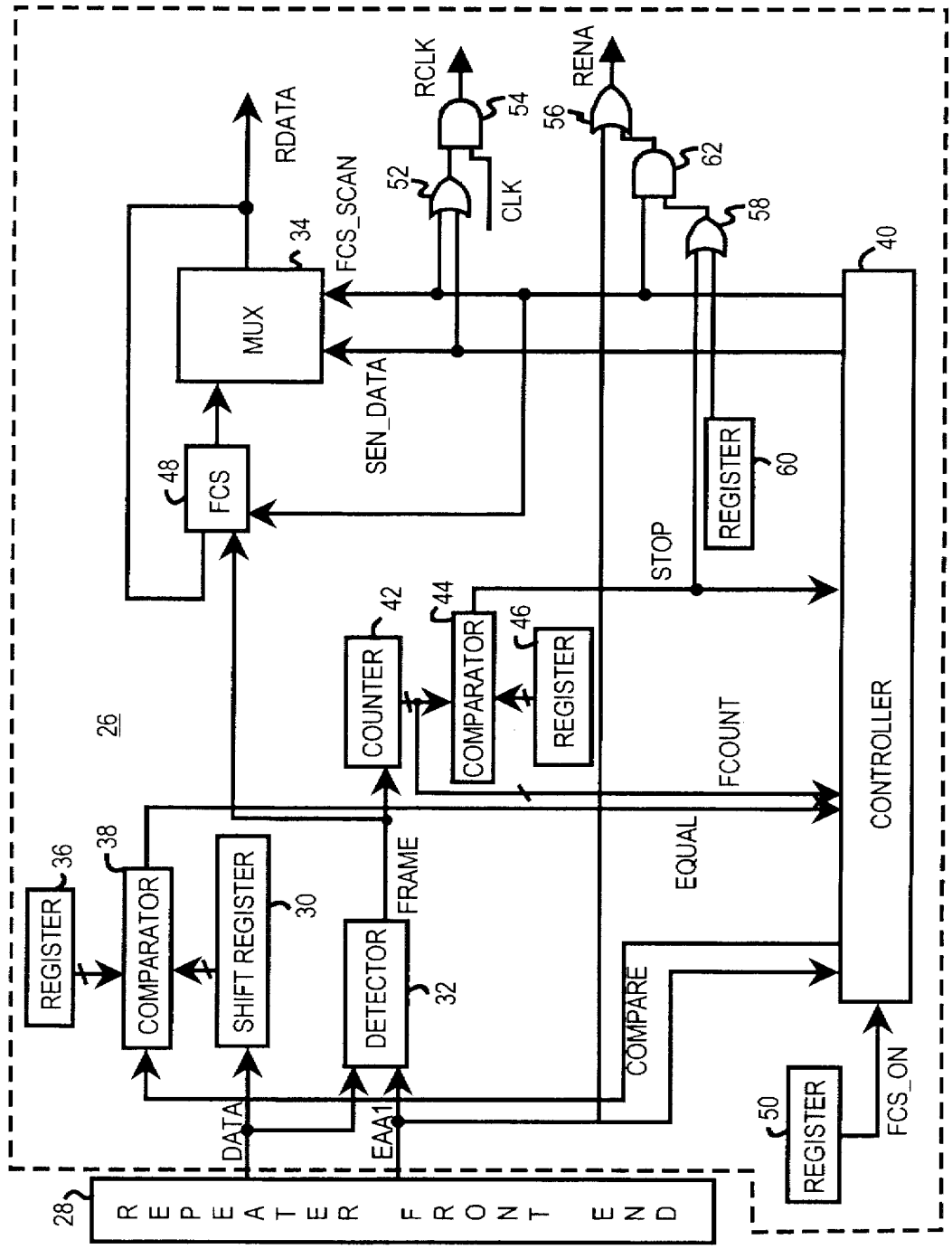
FIG. 6 is a circuit diagram of a packet compression circuit in accordance with the present invention.

FIG. 6 illustrates a data packet compression circuit 26 in accordance with the present invention that reduces memory storage requirements, uses a smaller bandwidth bus, and utilizes more efficient processing while maintaining proper statistical information for a network. The data packet compression circuit 26 is typically utilized with and coupled to a front end of the repeater 28 to control the transfer of compressed data to the MAC 20 (FIG. 5). Of course, under some circumstances the MAC 20 will want to receive the entire data packet. As an example, at times a DTE 14, 16 or 18 (FIG. 5) may explicitly address the MAC 20 as the destination address in the data packet to obtain statistical information from the management unit for analysis of the network. Therefore, the packet compression circuit 26 of FIG. 6 also provides the transfer of an entire data packet to the MAC 20.

When a repeater 12 (FIG. 5) receives a data packet from the network, an enable signal ENA is asserted through the repeater front end 28. The data packet is transferred to the packet compression circuit 26 through the DATA signal from repeater front end 28 to a shift register 30, a start of frame delimiter detector circuit 32, and a multiplexer (MUX) 34.

The shift register 30, a 48 bit shift register, for example, shifts in the destination address from the data packet. A memory register 36, in this embodiment, a 48 bit data register, stores an address corresponding to the address for the MAC 20. A comparator 38 compares the address stored in the memory register 36 to the destination address in the shift register 30 when the controller 40, e.g., a digital logic circuit or microcontroller, asserts a COMPARE signal upon completion of the destination address being shifted into the shift register 30. The comparator 38 outputs an EQUAL signal to the controller 40 when the comparison is completed.

The memory register 36, comparator 38, and the shift register 30 may also be formed by a circuit used for security purposes without departing from the spirit or scope of the present invention. Several suitable security circuits are described in co-pending U.S. patent applications entitled "Programmable Address Mapping Matrix for Secure Networks," Ser. No. 08/366,809, filed Dec. 30, 1994, and "Inverse Packet Disrupt for Secure Networks", Ser. No. 08/406,082, filed Mar. 17, 1995 on behalf of the inventors of the present invention, and assigned to the assignee of the present invention. Of course, other security circuits would be suitable if used to perform the comparison function, as described above.

Upon assertion of a high EQUAL signal, i.e., when a match exists and the data packet is addressed to the MAC 20, the controller 40 asserts a SENDDATA signal to the MUX 34 to select the DATA input line of the MUX 34. Thus, when the data packet explicitly addresses the MAC 20 as the destination address, the packet compression circuit 26 transmits the data uncompressed and unmodified to the MAC 20. The data packet is transferred from the MUX 34 with the controlled output of the RDATA, RCLK, and RENA signals.

The RENA signal functions as an indicator that the RCLK and RDATA signals are valid signals. The RDATA signal provides the data packet signal to the MAC 20. The RCLK signal provides synchronization for and control over the transfer of data to MAC 20. The logic control associated with these signals is presented more fully below.

When the EQUAL signal is at a low logic level, no match exists between the destination address in the data packet and the stored MAC address in the memory register 36. A mismatch between the addresses indicates that the MAC 20 is not the destined location for the data packet, and therefore, the entire data packet is not needed by the MAC 20.

Figure 7:
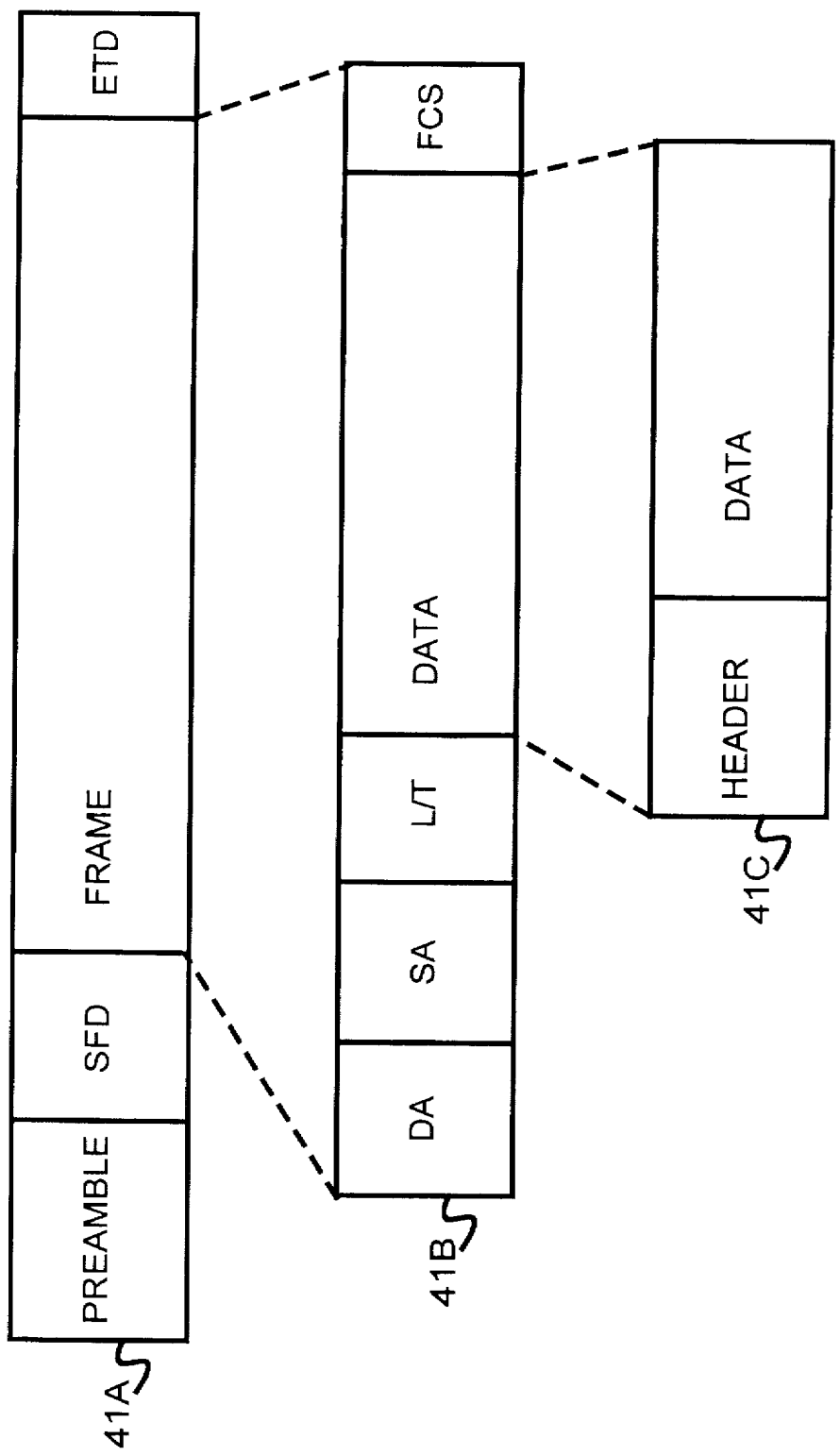
FIG. 7 illustrates several layers forming a data packet.

As described above with reference to FIGS. 1 and 2, a data packet or frame has several fields of information within the data portion of the packet. Typically, the packet is transferred via many layers. For example, as shown in FIG. 7, a packet 41a contains a preamble field, an SFD field, a frame field, and an ETD (end of transmission delimiter) field. The frame field comprises header information for the MAC layer 41b. The header information of MAC layer 41b includes a destination address, source address, and type or length field of the packet as well as the header information for the next layer 41c. The information of MAC layer 41b forms approximately the first fourteen bytes of the data packet. The packet compression circuit 26 of the present invention controls the formation of a new packet for transfer to the MAC 20 that includes approximately these first fourteen bytes of information and a chosen amount of additional information but does not include the entire data portion of the originally sent packet, i.e., the entire frame field of layer 41a.

Referring back to the packet compression circuit of FIG. 6, when the EQUAL signal is at a low level, a counter 42 receives a high level FRAME signal from the SFD detector 32. The high level FRAME signal results from a detection of the start of frame delimiter field by the SFD detector 32 and indicates that all subsequent bits on the DATA signal are the data contents of the packet. The SFD detector 32, e.g., a logic circuit, determines the proper SFD sequence indicator, as is well appreciated by those skilled in the art.

Once the FRAME signal is received, the counter 42 counts the number of bytes being transmitted in the DATA signal and outputs the number to a comparator 44. A signal FCOUNT is also output by the counter 42 to the controller 40 to ensure that the shut off of a data packet occurs on a byte boundary, i.e., that the count in the counter is divisible by 8. In some circumstances, a data packet may contain a count that is not divisible by eight, e.g., when a data packet contains extra bits, such as those caused by noise on the data line, for example, also known as dribbling bits. With the extra, dribbling bits, the data being counted may not form a whole number of bytes. The signal FCOUNT is input to the controller 40 to allow the controller 40 to monitor the total count in the counter, determine if the total count is a whole number of bytes, and delay the deassertion of the SENDDATA signal until an equivalent count corresponding to a whole number of bytes would occur.

The comparator 44 compares the number in the counter 42 with a byte total stored in register 46. A preferable minimum byte total of 6 in register 46 allows a minimum of the first six bytes of a data frame to be transferred into the counter 42 while the determination of whether the MAC 20 is the destined address for the data packet occurs. In a preferred embodiment, it has been found that a byte total of 14 in counter 42 is effective to allow for the minimum 6 bytes and a typical 8 bytes of header information which includes the destination address and the type/length fields. Of course, the byte total is adjustable according to a particular protocol's needs, as will be well appreciated by those skilled in the art.

The comparator 44 outputs a STOP signal to the controller 40 when the comparison of the byte total in the register 46 matches the count in the counter 42. The STOP signal stops the transfer of the remaining part of the data packet to the MAC 20 by causing the controller 40 to deassert the SENDDATA signal to the MUX 34.

In an alternate embodiment, the counter 42, comparator 44 and register 46 provide an adjustable byte count mechanism to allow further control over the exact bytes transferred in the compressed data packet. For example, it may be desirable to send data corresponding to bytes 20 to 29 of the original data packet as the compressed data packet. Under these circumstances, once the beginning byte, i.e., byte 20, has been received, the counter 42 can suitably provide a signal to the controller 40 and the comparator 44 to initiate the transfer of data and the comparison of the byte count to the stored count by comparator 44. The comparison by the comparator 44 of the count in counter 42 with the total count of ten, as stored in register 46 for bytes 20 to 29 in this example, suitably results in the assertion of the STOP signal when the total count and the stored count match.

The packet compression circuit 26 further includes a frame check sequence (FCS) circuit 48. The FCS circuit 48 provides a new FCS sequence for transmission following the compressed data packet. Since the original FCS sequence is not available once the data packet is compressed, the FCS circuit 48 generates a new FCS sequence to attach to the end of the compressed data packet. The attachment of a new FCS sequence permits a valid FCS to be transferred to those MAC units that do not recognize a packet without a valid FCS. Formation of the valid FCS sequence by FCS circuit 48 proceeds by calculating a four byte sequence indicative of the number of bits in the data packet, as is well appreciated by those skilled in the art.

When the FCS detector 48 receives the FRAME signal from SFD detector 32, the FCS circuit 48 is enabled to begin calculation of a new FCS sequence based on the RDATA values being fed back to the FCS circuit 48. Completion of the FCS sequence generation occurs when the SENDDATA signal is deasserted by the controller 40. The FCS sequence generated will not be affected by dribbling bits in the original packet when the controller 40 delays deassertion of the SENDDATA signal until a whole number of bytes would occur, as described earlier.

The controller 40 outputs an FCS SCAN signal to control the transmission of the new FCS sequence at the end of the compressed packet. When the FCS SCAN signal is asserted, the newly formed FCS sequence in the FCS circuit 48 is transferred through the MUX on the RDATA line. In an alternate embodiment, a data register, FCS ON register 50, is coupled to the controller 40 and provides further flexibility in controlling transmission of a new FCS sequence.

When the FCS ON register 50 contains a high logic bit for the FCS ON signal, the controller 40 activates the FCS SCAN appropriately for inclusion of the generated FCS sequence with the compressed data packet. Conversely, when the FCS ON signal is low, the controller 40 does not activate the FCS SCAN signal. Use of the FCD ON register 50 allows greater flexibility and control over the inclusion of a valid FCS signal at the end of the compressed data packet. For those MACs that do not require a valid FCS sequence, a low signal is preferably transmitted from the FCD ON register 50. The packet compression circuit 26 therefore allows a further reduction in the size of the data packet being transferred by not adding an FCS sequence that is unnecessary. The reduction in packet size thus further reduces the required memory space and processing time as well.

In a further aspect, a new FCS sequence is unnecessary when a data packet contains fewer data bytes than the upper limit as indicated by the number of bytes held in register 46. Under these circumstances, the original FCS sequence is valid, since the data packet is smaller than the set limit and therefore does not get compressed. The output of a new FCS sequence is unnecessary, and FCS SCAN does not get asserted by the controller 40.

The packet compression circuit further includes logic gates to control the output of the RCLK and RENA signals. As mentioned above, the RCLK signal controls the synchronization and transfer of data. Once the RCLK signal stops transitioning, data transfer also stops. An OR gate 52 receives the FCS SCAN signal on one input and the SEND DATA signal on a second input. The output of OR gate 52 is input to one input of AND gate 54, while the second input to AND gate 54 is a clock (CLK) signal. Thus, when either FCS SCAN or SENDDATA is at a high logic level as sent by the controller, the RCLK signal transitions in accordance with the CLK signal. By incorporating both the FCS_SCAN signal and the SENDDATA signal in the control of the output of the RCLK signal, the RCLK signal transitions appropriately during the transfer of the valid FCS at the end of the compressed data packet, as well as during the transmission of either an original or compressed data packet.

The output of the RENA signal is also suitably controlled using several logic gates. Preferably, the RENA signal is output at a high logic level while the ENA signal is at a high logic level. Thus, one input into OR gate 56 is the ENA signal, so that the output of OR gate 56 remains high for the duration of a high ENA signal. Of course, for compressed data packets, the RENA signal will remain high longer than is needed, since the ENA signal remains high while the original data packet is transmitted to the repeater. However, the control of the RCLK signal with the STOP signal appropriately stops the transmission of the data to the MAC 20 even while RENA remains high. Further, keeping the RENA signal high for the entire packet duration prevents the MAC 20 from falsely sensing no network activity and transmitting to the network.

Once the data packet has been transferred, the ENA signal normally goes low. However, when the data packet is compressed, the RENA signal preferably remains high for the transfer of the new FCS sequence, as well. An OR gate 58 receives the STOP signal from comparator 44 on one input. A second input to OR gate 58 is a logic bit from a register 60. When either the STOP signal or the logic bit from the register 60 is high, the output from OR gate 58 is high. The output from OR gate 58 is input into one input of AND gate 62. A second input into AND gate 62 is the FCS SCAN signal. The output of AND gate 62 is the second input to OR gate 56. When both FCS SCAN and the output of OR gate 58 are high, the input into OR gate 56 is high, thus ensuring that the RENA signal is kept high with the FCS SCAN signal while the new FCS signal is transferred on RDATA.

The circuitry including register 60 provides flexibility in controlling the RENA signal. With a high bit in register 60, the FCS SCAN signal directly controls the logic level output of AND gate 62 for one input into OR gate 56. However, with a low bit in register 60, the output of AND gate 62 is contingent on both the STOP signal and FCS SCAN signal. Thus, the RENA signal will only remain high for the duration of the transmission of a new FCS sequence when the output of a high STOP signal occurs before the end of a packet. The circuitry including register 60 suitably further ensures that the RENA signal does not remain high for the transmission of a new FCS sequence on a packet that does not get compressed, e.g., a packet that is shorter than the stored limit.

Although the present invention has been described in accordance with the embodiments shown in the figures, one of ordinary skill in the art recognizes there could be variations to the embodiments and those variations would be within the spirit and scope of the present invention. For example, additional circuit components could be implemented to allow additional data to be tagged onto the compressed data packet in a similar manner to and before the addition of the new FCS sequence. Such additional data may include statistical information about the packet, e.g., new length of the data packet, actual length of the original data packet, and a CRC error indicator. For example, refer to copending patent application entitled "A Method and System for Increasing Network Information Carried in a Data Packet Via Packet Tagging". Additionally, the packet compression circuit of the present invention has been discussed with reference to a single repeater circuit. Of course, the packet compression circuit could also be used with several interconnect repeater circuits which form a single logical repeater, to control compression on data packets received. Accordingly, many modifications may be made by one of ordinary skills in the art without departing from the spirit and scope of present invention, the scope of which is defined solely by the appended claims.

We claim:

1. A method for providing an efficient transfer of information from a data packet being transmitted on a network, the method comprising the steps of:

(a) receiving a data packet on a repeater in the network, the data packet including a destination address;

(b) determining whether the destination address matches an associated stored management unit address; and (c) compressing the data packet transmitted from the repeater to a management unit when the destination address does not match the stored address.

2. The method of claim 1 wherein when the destination address does match the stored address the data packet is not compressed.

3. The method of claim 1 wherein step (c) further comprises identifying a start of frame delimiter (SFD) of the data packet.

4. The method of claim 3 further comprising the step of counting a number of bytes in the data packet following identification of the SFD.

5. The method of claim 4 further comprising comparing the counted number of bytes with a stored number of bytes.

6. The method of claim 5 further comprising the step of halting transmission of the data packet when the counted number of bytes matches the stored number of bytes.

7. The method of claim 4 further comprising starting the transmission of the data packet when the counted number of bytes matches the stored number of bytes.

8. The method of claim 4 further comprising the starting and stopping of the transmission of the data packet when the counted number of bytes matches the stored number of bytes.

9. The method of claim 6 in which the stored number of bytes is a programmable number of bytes.

10. The method of claim 9 in which the stored number of bytes defaults to a predetermined number upon reset of the network.

11. The method of claim 10 in which the predetermined number of stored bytes is fourteen.

12. The method of claim 1 further comprising the step of providing a valid frame check sequence (FCS) at the end of the compressed data packet.

13. The method of claim 12 wherein the valid FCS providing step is enabled individually for each data packet being transferred.

14. The method of claim 13 which includes the steps of tagging statistical bits onto each data packet.

15. An apparatus for controlling an efficient transfer of information from data packets being transmitted on a network comprising:

a repeater means for receiving a data packet, the data packet having a destination address;

a management unit means coupled to the repeater means for determining network statistical information based on the data packets, the management unit means having a stored address; and a packet compression means coupled between the repeater means and the management unit means for performing a comparison of the stored address and the destination address and selectively compressing the data packet being transmitted to the management unit means based on a match condition from the comparison before the data packets are received by the management unit means.

16. The apparatus of claim 15 wherein the packet compression means further comprises a first comparator circuit for comparing the destination address of the data packet to the stored address.

17. The apparatus of claim 16 wherein when the first comparator circuit determines that the destination address matches the stored address, the packet compression means does not compress the data packet.

18. The apparatus of claim 16 wherein when the first comparator circuit determines that the destination address and the stored address do not match, the packet compression means compresses the data packet.

19. The apparatus of claim 14 further comprising a SFD detector means coupled to the repeater means for detecting a SFD sequence in the data packet.

20. The apparatus of claim 19 further comprising a second comparator circuit coupled to the SFD detector means.

21. The apparatus of claim 20 wherein the second comparator circuit counts a number of bytes in the data packet once the SFD is detected and compares the counted number of bytes to a stored number of bytes.

22. The apparatus of claim 21 wherein the second comparator circuit means outputs a signal to stop transmission of the data packet when the stored number of bytes matches the counted number of bytes.

23. The apparatus of claim 21 wherein the second comparator circuit means outputs a signal to start transmission of the data packet when the stored number of bytes matches the counted number of bytes.

24. The apparatus of claim 21 further comprising an FCS circuit means for generating an FCS sequence for the data packet.

25. The apparatus of claim 23 wherein the controller means controls attachment of the generated FCS sequence to the data packet.

26. The apparatus of claim 25 wherein the controller means attaches the generated FCS sequence to a compressed data packet.

27. The apparatus of claim 26 wherein the controller means does not attach the generated FCS sequence to an uncompressed data packet.

28. The apparatus of claim 25 further comprising a register means coupled to the controller means for storing a signal to control attachment of the generated FCS sequence to the compressed data packet.

29. The apparatus of claim 28 wherein the register outputs a high signal to attach the generated FCS sequence to the compressed data packet.

30. The apparatus of claim 26 wherein the register means outputs a low signal to not attach the generated FCS sequence to the compressed data packet.

31. A repeater for transferring information efficiently within a network, the repeater comprising:

a repeater front end means for transferring control signals and data from a data packet, the data packet having a destination address; and a packet compression means coupled to the repeater front end means for receiving the data packet from the repeater front end means, performing a comparison of a stored address and the destination address, and selectively compressing the data packet based on a match condition resulting from the comparison.

32. The repeater of claim 31 wherein the packet compression means compresses the data packet when the stored address does not match the destination address.

33. The repeater of claim 31 further comprising a management unit means coupled to the packet compression means for determining network statistical information based on the data packets, the management unit means having an address equal to the stored address.

34. An apparatus for controlling an efficient transfer of information from data packets on a network comprising:

a repeater means for receiving a data packet, the data packet having a destination address;

a management unit means coupled to the repeater means for determining network statistical information based on the data packets, the management unit means having a stored address; and a packet compression means coupled between the repeater means and the management unit means for performing a comparison of the stored address and the destination address and compressing the data packet based on the comparison before the data packets are received by the management unit means, the packet compression means further comprising:

a first comparator circuit for comparing the destination address of the data packet to the stored address;

a SFD detector means coupled to the repeater means for detecting a SFD sequence in the data packet;

a second comparator circuit coupled to the SFD detector means for counting a number of bytes in the data packet once the SFD is detected and comparing the counted number of bytes to a stored number of bytes;

an FCS circuit means for generating an FCS sequence for the data packet; and a controller means coupled to the first comparator circuit means, the second comparator means, and the FCS circuit means for controlling compression of the data packet and attachment of the generated FCS sequence to the data packet.

35. The apparatus of claim 34 in which a signal is held high, even though the data packet is compressed.

* * * * *